(12) United States Patent
Ott et al.

(10) Patent No.: US 10,508,759 B2
(45) Date of Patent: Dec. 17, 2019

(54) METHOD OF MANUFACTURING AN INSULATED FLOWPATH ASSEMBLY (71) Applicant: United Technologies Corporation, Farmington, CT (US)

(72) Inventors: Joe Ott, Enfield, CT (US); John J. Rup, Jr., Willington, CT (US); Shawn Stempinski, Simsbury, CT (US); Stanley J. Funk, Southington, CT (US); Dennis M. Moura, South Windsor, CT (US); Lexia Kironn, Rocky Hill, CT (US); Roger O. Coffey, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 211 days.

(21) Appl. No.: 15/661,791

(22) Filed: Jul. 27, 2017

(65) Prior Publication Data

US 2017/0321824 A1 Nov. 9, 2017

Related U.S. Application Data

(62) Division of application No. 14/790,928, filed on Jul. 2, 2015, now Pat. No. 9,759,356.

(Continued)

(51) Int. Cl.
*F16L 9/18* (2006.01)
*B33Y 10/00* (2015.01)
(Continued)

(52) U.S. Cl.
CPC .............. *F16L 9/18* (2013.01); *B22F 3/1055* (2013.01); *B22F 5/10* (2013.01); *B33Y 10/00* (2014.12);
(Continued)

(58) Field of Classification Search
CPC ..... F16L 9/18; F16L 59/14; B22F 5/10; B22F 3/1055; F02C 7/222; B33Y 10/00;
(Continued)

(56) References Cited

U.S. PATENT DOCUMENTS 2,531,658 A 11/1950 Walsh
3,547,161 A 12/1970 Reece
(Continued)

FOREIGN PATENT DOCUMENTS

WO 2009039142 3/2009
WO 2009126701 10/2009

OTHER PUBLICATIONS

Office action for EP15175319.1 dated Jan. 4, 2018.

*Primary Examiner* — Sarang Afzali
(74) *Attorney, Agent, or Firm* — O'Shea Getz P.C.

(57) ABSTRACT

A flowpath assembly has a first conduit defining a flowpath radially inward, and a second conduit spaced radially outward from the first conduit. A void defined between the first and second conduits contains an insulating material that may have a greater porosity than the first and second conduits. The assembly may be additive manufactured generally as one unitary piece with the raw material of the conduits being melted and solidified on a slice-by-slice basis and the insulating material being selectively bypassed by an energy gun of an additive manufacturing system.

2 Claims, 5 Drawing Sheets

Related U.S. Application Data (60) Provisional application No. 62/020,723, filed on Jul. 3, 2014.

(51) Int. Cl.

| | | |
|---|---|---|
| *B23P 15/00* | (2006.01) | |
| *F23R 3/28* | (2006.01) | |
| *B33Y 80/00* | (2015.01) | |
| *B22F 3/105* | (2006.01) | |
| *F16L 59/14* | (2006.01) | |
| *F02C 7/22* | (2006.01) | |
| *B22F 5/10* | (2006.01) | |

(52) U.S. Cl.
CPC .............. *B33Y 80/00* (2014.12); *F02C 7/222* (2013.01); *F16L 59/14* (2013.01); *F23R 3/283* (2013.01); *F23R 2900/00018* (2013.01)

(58) Field of Classification Search
CPC ................ B33Y 80/00; F23R 3/283; F23R 2900/00018; B23P 15/008; B23P 2700/13; F05D 2230/00; F05D 2230/30; Y10T 29/4932; Y10T 29/49323; Y10T 29/49346; Y10T 29/49361
See application file for complete search history.

(56) References Cited

U.S. PATENT DOCUMENTS

| | | |
|---|---|---|
| 3,693,665 A | 9/1972 | Veerling et al. |
| 4,461,743 A | 7/1984 | Chowdhury et al. |
| 4,700,751 A | 10/1987 | Fedrick |
| 6,058,979 A | 5/2000 | Watkins |
| 6,149,075 A | 11/2000 | Moertle et al. |
| 6,357,222 B1 | 3/2002 | Schilling et al. |
| 6,715,292 B1 | 4/2004 | Hoke |
| 7,007,864 B2 | 3/2006 | Snyder et al. |
| 8,205,643 B2 | 6/2012 | Lee et al. |
| 8,240,151 B2 * | 8/2012 | Pelletier ............... F23D 11/107 60/740 |
| 8,689,563 B2 | 4/2014 | Low |
| 8,733,078 B2 | 5/2014 | Alholm |
| 8,833,401 B2 | 9/2014 | Blumenthal et al. |
| 8,973,368 B2 | 3/2015 | Dai et al. |
| 9,068,751 B2 | 6/2015 | Snyder |
| 9,115,897 B2 | 8/2015 | Synder et al. |
| 2006/0169344 A1 | 8/2006 | Toole |
| 2009/0200275 A1 | 8/2009 | Twelves, Jr. et al. |
| 2010/0251720 A1 | 10/2010 | Pelletier et al. |
| 2011/0247590 A1 | 10/2011 | Donovan |
| 2014/0182292 A1 | 7/2014 | Hudon et al. |
| 2015/0003997 A1 | 1/2015 | Mironets et al. |

* cited by examiner

METHOD OF MANUFACTURING AN INSULATED FLOWPATH ASSEMBLY

This patent application is a divisional of and claims priority to U.S. patent application Ser. No. 14/790,928 filed Jul. 2, 2015, which claims priority to U.S. Provisional Patent Application No. 62/020,723 filed Jul. 3, 2014. The disclosures of which are hereby incorporated herein by reference in their entireties.

BACKGROUND

The present disclosure relates to a flowpath assembly, and more particularly to an insulated flowpath assembly.

Manufacturing of flowpath assemblies such as those containing conduits within conduits (or concentrically located conduits), as one example, require the manufacture of several individual parts, then assembly to create the final product. In some examples, air within an annular void defined between the two concentrically located conduits acts as a thermal insulator for fluid that may be flowing through the inner conduit. Sealing of this void (i.e. complete encapsulation) to enhance the thermal properties of the surrounding air is difficult from a manufacturing perspective and not typically accomplished, and if such were accomplished, it would require yet further parts thus limiting feasibility.

There exist needs in various industries to reduce the number of manufactured parts for conduit or conduit-like assemblies, thereby providing more robust and simpler designs requiring less maintenance, reducing manufacturing time and costs, improving thermal barrier characteristics, and/or reducing thermal conduction paths between inner and outer conduits of the assemblies, amongst others.

SUMMARY

A flowpath assembly according to one, non-limiting, embodiment of the present disclosure includes a first conduit defining a flowpath radially inward and extending along a centerline; a second conduit spaced radially outward from the first conduit with a void defined by and radially between the first and second conduits; and an insulating material disposed in the void.

Additionally to the foregoing embodiment, the void is sealed and at a negative atmospheric pressure.

In the alternative or additionally thereto, in the foregoing embodiment, the first and second conduits are additive manufactured simultaneously.

In the alternative or additionally thereto, in the foregoing embodiment, the insulating material is a powder deposited during the simultaneous additive manufacturing of the first and second conduits.

In the alternative or additionally thereto, in the foregoing embodiment, the first and second conduits are one unitary piece.

In the alternative or additionally thereto, in the foregoing embodiment, the assembly includes a third conduit co-extending with the first conduit and spaced radially inward from the second conduit.

In the alternative or additionally thereto, in the foregoing embodiment, the assembly includes a support structure located in the void and engaged between the first and second conduits.

In the alternative or additionally thereto, in the foregoing embodiment, the first and second conduits and the support structure are additive manufactured as one unitary piece.

In the alternative or additionally thereto, in the foregoing embodiment, the insulating material has a greater porosity than the conduits.

In the alternative or additionally thereto, in the foregoing embodiment, the assembly is part of a fuel injector for a gas turbine engine.

In the alternative or additionally thereto, in the foregoing embodiment, the first conduit is substantially concentric to the second conduit.

A flowpath assembly according to another, non-limiting, embodiment includes a first conduit for flowing a fluid; a second conduit surrounding and spaced radially outward from the first conduit with an insulating void defined between the first and second conduits; a loosely packed material in the void; and wherein the flowpath assembly is additive manufactured as one unitary piece.

Additionally to the foregoing embodiment, the material has insulating properties and is deposited during additive manufacturing of the first and second conduits.

In the alternative or additionally thereto, in the foregoing embodiment, the assembly includes a support structure in the void and including a plurality of pylons each engaged to and extending between the first and second conduits.

In the alternative or additionally thereto, in the foregoing embodiment, the insulating material and the support structure have the same material composition.

A method of manufacturing a flowpath assembly according to another, non-limiting, embodiment includes the steps of electronically modeling the flowpath assembly having a first conduit co-extending and surrounded by a second conduit; additive manufacturing the first conduit; additive manufacturing the second conduit generally simultaneously to manufacturing of the first conduit; and depositing an insulating material generally during manufacturing of the first and second conduits.

Additionally to the foregoing embodiment, the additive manufacturing of the first and second conduits and the depositing of the insulating material all include depositing of a powder.

In the alternative or additionally thereto, in the foregoing embodiment, the method includes the step of additive manufacturing a support structure engaged between the first and second conduits and generally during the manufacturing of the first and second conduits.

In the alternative or additionally thereto, in the foregoing embodiment, the support structure and the insulating material are made of the same material composition.

In the alternative or additionally thereto, in the foregoing embodiment, the flowpath assembly is modeled into a plurality of slices each slice having a portion of the first conduit, the second conduit and the insulating material, and a first slice of the plurality of slices is manufactured in-part through melting and solidification before proceeding to the manufacture of a next successive slice of the plurality of slices, and the insulating material is not melted.

The foregoing features and elements may be combined in various combinations without exclusivity, unless expressly indicated otherwise. These features and elements as well as the operation thereof will become more apparent in-light of the following description and the accompanying drawings. It should be understood; however, that the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
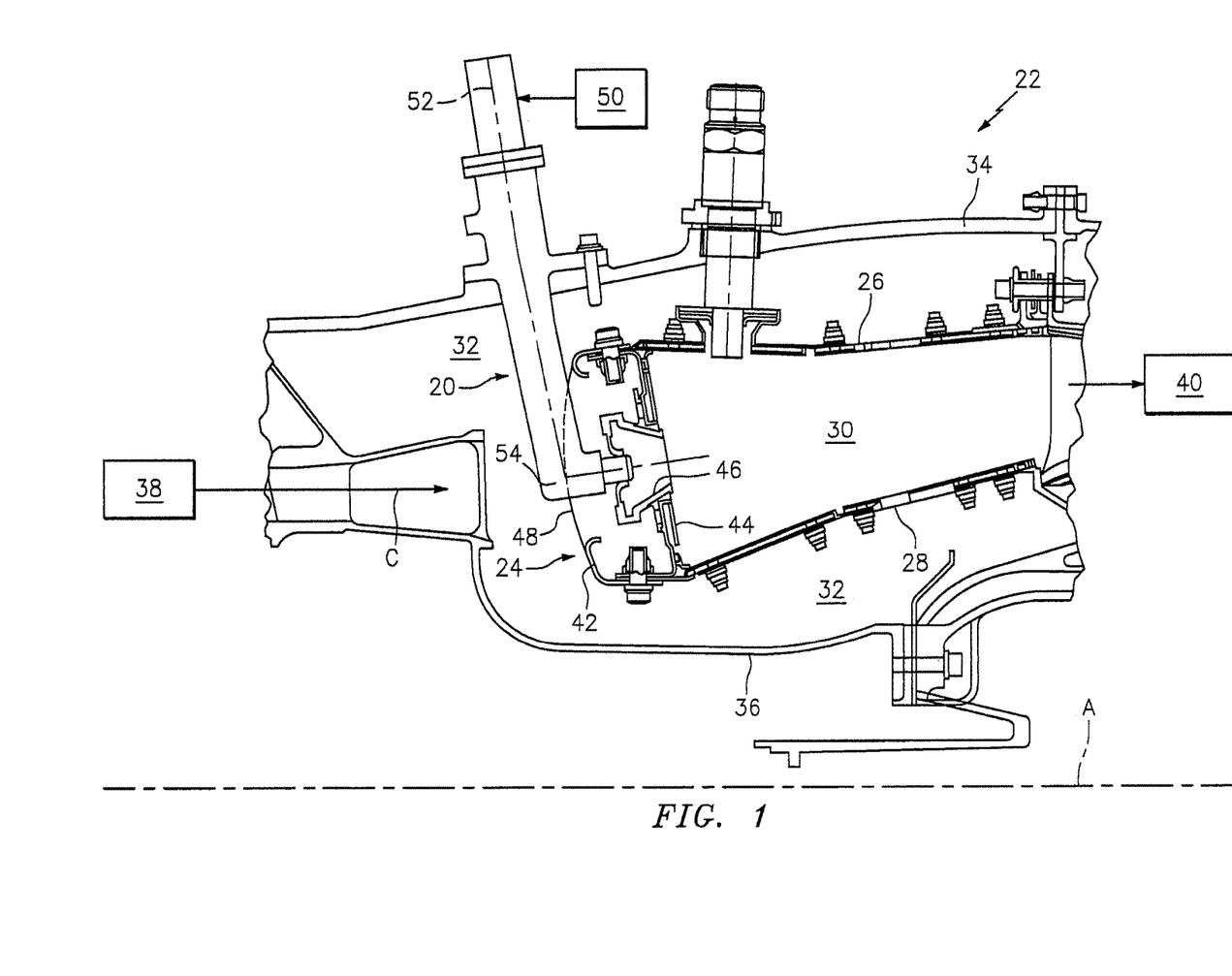
FIG. 1 is a cross section of a combustor of a gas turbine engine illustrating a fuel injector as an example of a flowpath assembly of the present disclosure.

FIG. 1 illustrates a fuel injector for a gas turbine engine as one, non-limiting, example of a flowpath assembly 20. The fuel injector 20 is part of a combustor 22 that may be annular in shape and concentrically disposed to an engine axis A. The combustor 22 may further include a bulkhead assembly 24, an outer wall 26, an inner wall 28, and a diffuser case module 34. The outer and inner walls 26, 28 project axially in a downstream direction from the bulkhead assembly 24, and radially define an annular combustion chamber 30 therebetween. An annular cooling plenum 32 is generally defined radially between the outer diffuser case module 34 and a diffuser inner case 36 of the engine. The bulkhead assembly 24 and walls 26, 28 are located in the cooling plenum 32 immediately downstream from a compressor section 38, and upstream from a turbine section 40 of the engine.

The annular bulkhead assembly 24 may extend radially between and is secured to the forward most ends of the walls 26, 28. Assembly 24 generally includes an annular hood 42, a wall or heat shield 44 that defines the axial upstream end of the combustion chamber 30, and a plurality of swirlers 46 (one shown) spaced circumferentially about engine axis A and generally projecting or communicating through the wall 44. A plurality of circumferentially distributed hood ports 48 accommodate a respective plurality of the fuel injectors 20 as well as direct compressed air C into the forward end of the combustion chamber 30 through the associated swirler 46.

The bulkhead assembly 24 introduces core combustion air into the upstream end of the combustion chamber 30 while dilution and cooling air is introduced into the combustion chamber 30 through the walls 26, 28 and from the plenum 32. The plurality of fuel injectors 20 and respective swirlers 46 facilitate the generation of a blended fuel-air mixture that supports combustion in the combustion chamber 30.

Each fuel injector 20 may receive fuel from at least one fuel manifold 50 generally located radially outward of the case module 34. The elongated fuel injector 20 may substantially extend longitudinally along a centerline 52 and in a radial inward direction with respect to the engine axis A, through the case module 34 and into the plenum 32. The centerline 52 and thus the injector 20 then bends (i.e. see bend 54) and projects in an axial downstream direction, extending through the hood port 48 and into the swirler 46 where fuel is then dispensed and atomized from the injector 20.

Figure 2:
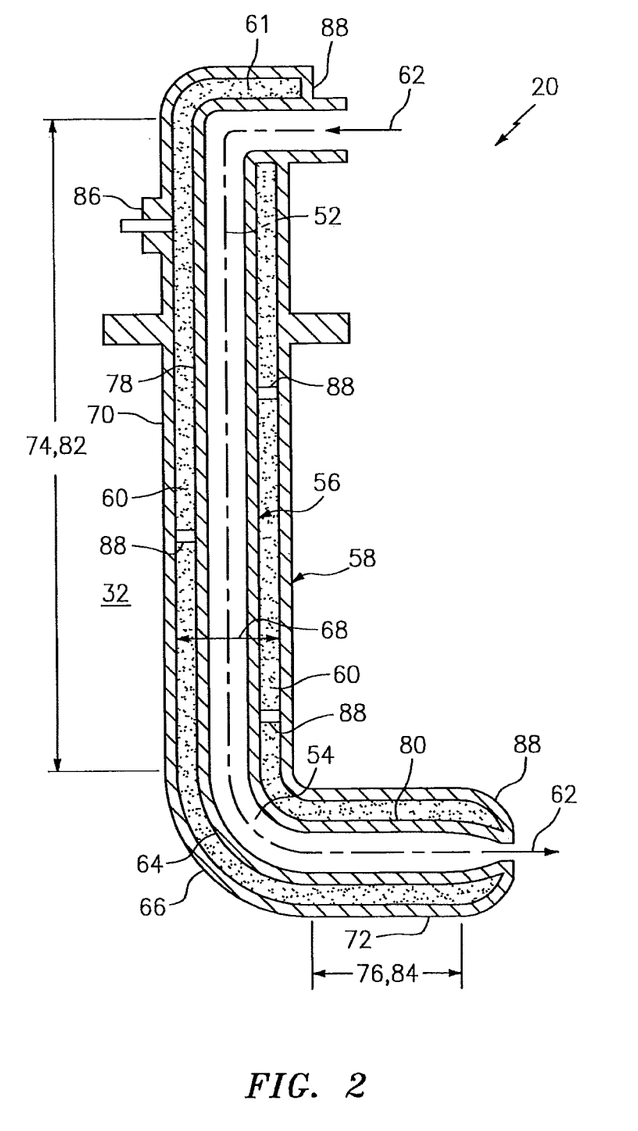
FIG. 2 is a cross section of the flowpath assembly.

Referring to FIG. 2, the flowpath assembly 20 (i.e. a simplified fuel injector in the present example) may have a first or inner conduit 56 co-extending with and surrounded by (e.g. concentrically located) to a second or outer conduit 58. The outer conduit 58 may be spaced radially outward from the inner conduit 56 thereby defining a substantially annular void 60, therebetween. Void 60 is generally filled with a loosely packed or granular material 61 that may have insulating properties, and the void may further be generally sealed (i.e. completely encapsulated) from the plenum 32 and/or surrounding environment to further enhance thermal insulation of fluid (see arrow 62) flowing through the inner conduit 56. To further enhance the thermal insulating properties, the void 60 may be under a negative atmospheric pressure and may further contain an inert gas such as nitrogen ($N_2$), Argon or any other gas compatible with the material composition of the surrounding structures and material 61. Although liquid fuel in the present example, it is contemplated and understood that the fluid 62 may also be a gas, liquid such as oil and water, or even a solid material (e.g. powder) capable of flow. It is further understood that the term "conduit" also refers to tubes, casings, pipes and other structures capable of fluid flow and/or encasement of the insulating material 61.

Such fuel injectors 20 flowing liquid fuel and operating in hot environments like the plenum 32 where temperatures may exceed 1,700 degrees Fahrenheit (927 degrees Celsius) are susceptible to fuel varnishing and coking due to high temperatures of more traditional fluid bearing conduit(s). This coking can lead to decreased flow capacity of the injector and decreased quality of fuel delivery. To manage the temperature of the conduit 56 and thus the fluid or fuel 62 and prevent coking, the void 60 is employed to break the thermal conduction path from the hot external environment to the inner conduit 56. It is further contemplated and understood that other portions of a fuel delivery system of the gas turbine engine may employ the same type of assembly 20. For instance, the fuel manifold 50 may be susceptible to similar coking issues leading to unintentional mal-distribution of fuel in the system, and thus benefit from the same means of insulating a conduit bearing fluid flow.

The inner and outer conduits 56, 58 may each have at least one respective bend 64, 66 that generally corresponds with the bend(s) 54 of the centerline 52 and such that the void 60 is generally maintained (i.e. spacing between conduits). The bends 64, 66 may be such where longitudinal insertion of the inner conduit 56 into the outer conduit 58 (and if the conduits were separate pieces) is not possible. With such fitting difficulties, additive manufacturing the conduits 56, 58 generally together and/or simultaneously is advantageous. As an example of such insertion difficulties that the additive manufacturing process resolves, the outer conduit 58 may be lacking any line-of-site through the conduit and the inner conduit 56 is too large to freely fit completely into the outer conduit 58. More specifically, the outer conduit 58 may have an inner diameter (see arrow 68) and two substantially straight portions 70, 72 projecting outward from respective opposite ends of the bend 66. The straight portions 70, 72 and have respective longitudinal lengths (see respective arrows 74, 76) that are substantially longer than the inner diameter 68. The inner conduit 56 may similarly have substantially straight portions 78, 80 projecting outward from respective ends of the bend 64. These straight portion 78, 80 may have respective longitudinal lengths (see respective arrows 82, 84) that are each longer than the inner diameter 68 of the outer conduit 58. In such a dimensional relationship, fitting of the inner conduit 56 into the outer conduit 58 may be difficult if not impossible. Alternatively, each conduit may have multiple bends along the centerline 52 that may be directed in different directions, this multiple bend configuration would also make fitting or insertion of the inner conduit 56 into the outer conduit 58 difficult, if not impossible.

The fuel injector 20 may further have a pressure release or maintenance feature 86 supported by and communicating through the outer conduit 58 for creating and maintaining the vacuum or negative atmospheric pressure in the void 60. The feature 86 may further assist in restoring the vacuum after a repair procedure or rupture of the outer conduit 58. The feature 86 may be additive manufactured as one unitary piece to the assembly or may be adhered and/or brazed to the outer wall 58 after additive manufacturing is completed. The negative atmospheric pressure may be about three pounds per square inch (21 kPa).

The fuel injector 20 may include at least one support structure 88 for properly locating the inner conduit 56 with respect to the outer conduit 58. The support structure 88 may be generally located at one or both of the distal ends of the fuel injector 20 (e.g. the distal joinder of the inner conduit 56 to the outer conduit 58. Alternatively, or in addition thereto, the support structure 88 may be a plurality of pylons that traverse the void 60 and connect the inner conduit 56 to the outer conduit 58. Such pylons are spaced axially and circumferentially with respect to the centerline 52, may be additively manufactured as one unitary piece to both of the conduits 56, 58, and are minimal in mass to limit thermal conduction from the outer conduit to the inner conduit. The number of pylons are dictated by the structural needs of the fuel injector or assembly 20 and may be about 0.004 inches (0.102 millimeters) in diameter, or the minimal production capability of the additive manufacturing process. It is further understood and contemplated that the insulating material 61, and although loosely packed, may provide structural support in addition to (or instead of) the pylons.

The flowpath assembly 20, or portions thereof, may be additive manufactured as one unitary and homogenous piece. Material compositions include, but are not limited to, nickel (e.g. INCONEL 718, 625), Waspaloy® (of United Technologies Corporation), Stellite® (of the Deloro Stellite Company), titanium, steels and stainless steels, cobalt, chrome, Hastalloy®X (of Haynes International Corporation), and others.

Figure 3:
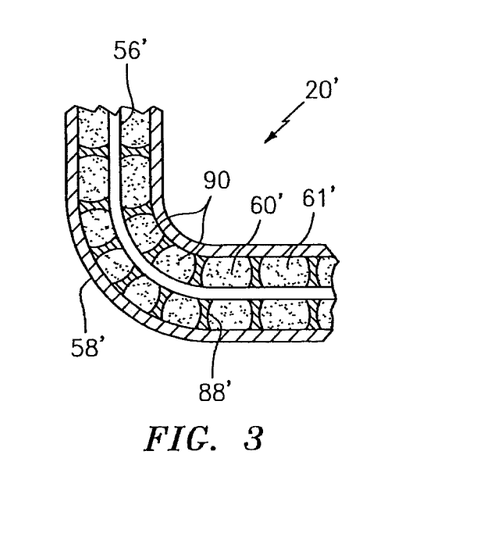
FIG. 3 is a partial cross section of a second embodiment of a flowpath assembly.

Referring to FIG. 3, a second embodiment of a flowpath assembly is illustrated wherein like elements have like identifying numerals except with the addition of a prime symbol. The flowpath assembly 20' of the second embodiment has a support structure 88' that is generally of a honeycomb orientation. The honeycomb may function to divide the annular void 60' into a plurality of individually sealed void portions 90 each having an insulating material 61'.

Figure 4:
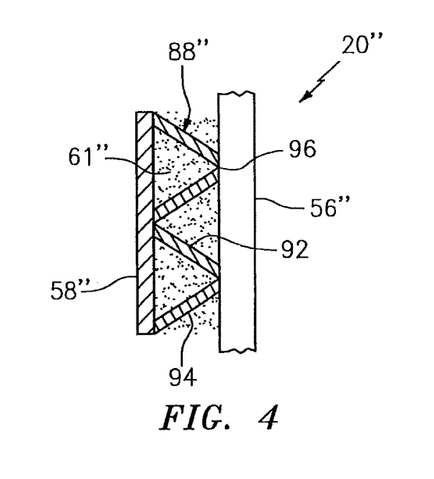
FIG. 4 is a partial cross section of a third embodiment of a flowpath assembly.

Referring to FIG. 4, a third embodiment of a flowpath assembly is illustrated wherein like elements have like identifying numerals except with the addition of a double prime symbol. The flowpath assembly 20" of the third embodiment has a support structure 88" that is girder-like. That is, a plurality of pylons may be paired such that the ends of two pylons 92, 94 and the inner conduit 56" connect to one-another at a junction 96 and the opposite ends of the respective pylons 92, 94 are spaced from one-another and individually connect to the outer conduit 58. In this way, minimal contact is made with the inner conduit 56", thereby reducing thermal conduction.

Figure 5:
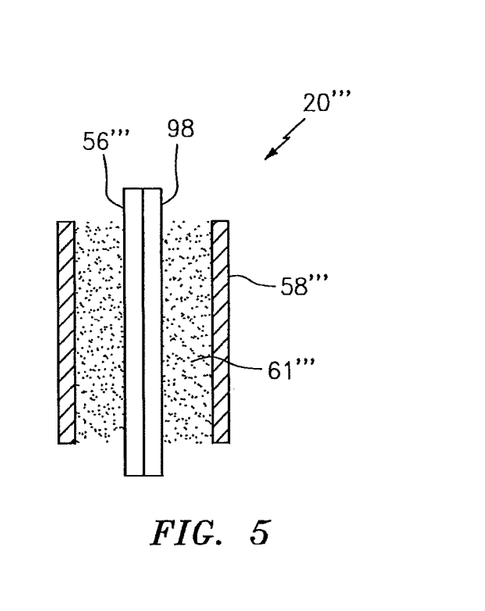
FIG. 5 is a partial cross section of a fourth embodiment of a flowpath assembly.

Referring to FIG. 5, a fourth embodiment of a flowpath assembly is illustrated wherein like elements have like identifying numerals except with the addition of a triple prime symbol. The flowpath assembly 20''' may include a third conduit 98 that co-extends with a first conduit 56''' and is surrounded by and radially spaced inward from an outer conduit 58'''. All three conduits may be additive manufactured together and/or simultaneously to simplify assembly and reduce the number of assembly parts.

Examples of additive manufacturing processes include, but are not limited to, laser powder bed, electron beam melting, free form fabrication laser powder deposition and electron beam wire deposition, amongst others. Additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of the workpiece, layer-by-layer. The principle behind additive manufacturing processes may involve the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. These devices are directed by three-dimensional geometry solid models developed in Computer Aided Design (CAD) software systems.

Figure 6:
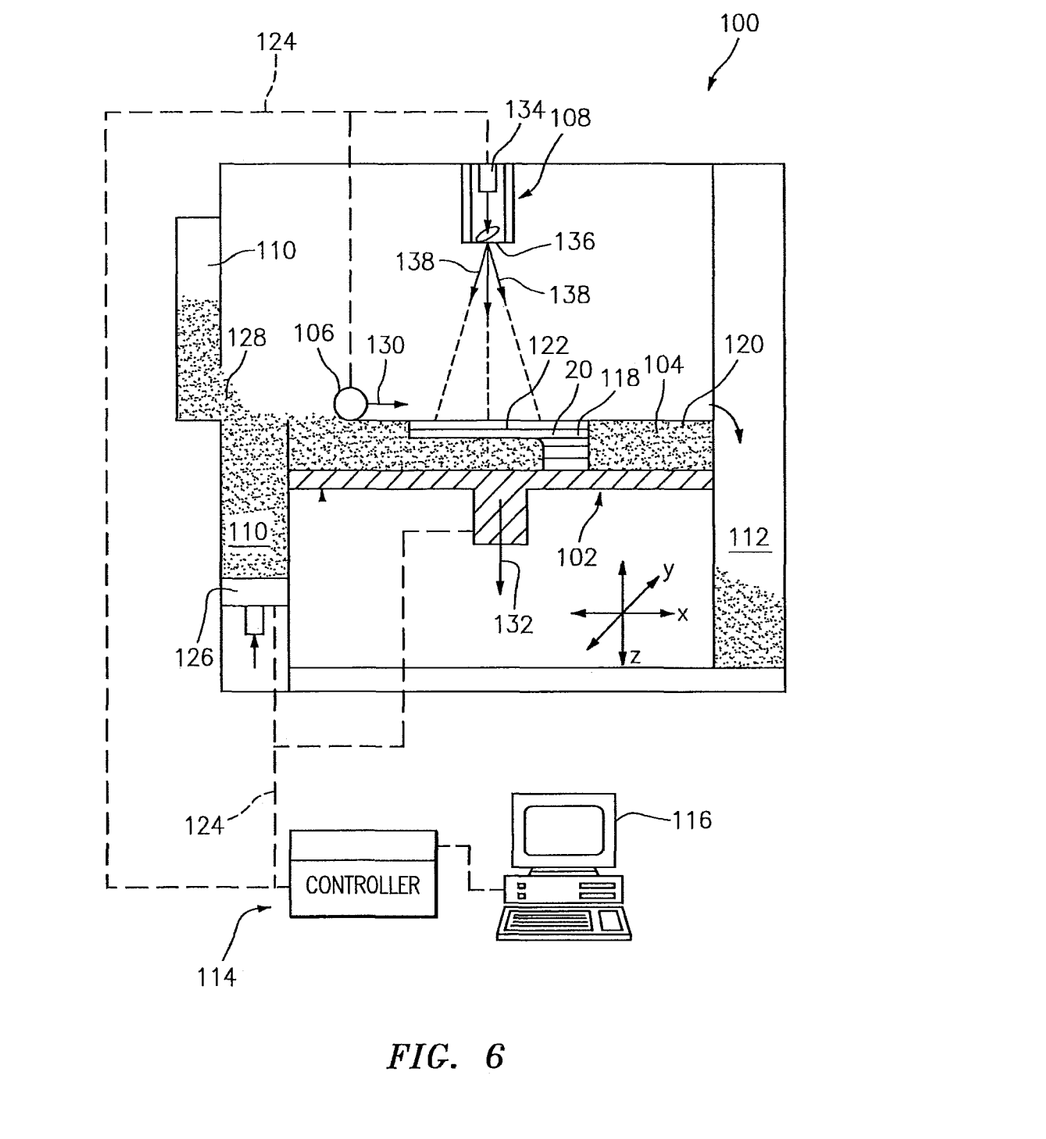
FIG. 6 is a schematic of an additive manufacturing system used to manufacture the flowpath assembly.

One example of an additive manufacturing system 100 capable of manufacturing the flowpath assembly 20 is schematically illustrated in FIG. 6. The additive manufacturing system 100 has a build table 102 for supporting the assembly 20 and generally holding a powder bed 104, a particle spreader, wiper or sprayer 106 for spreading, spraying or otherwise placing the powder bed 104 over the manufacture portion of the assembly 20 and build table 102, an energy gun 108 for selectively melting regions of a layer of the powder bed, a powder supply hopper 110 for supplying powder to the spreader 106, and a powder surplus hopper 112. The additive manufacturing system 100 may be constructed to build the assembly 20, or any portions thereof, in a layer-by-layer fashion. The powder bed 104 is composed of the same material composition as the assembly being additively manufactured.

A controller 114 of the additive manufacturing system 100 may include a computer 116 for entering data and that contains software for programming automated functions in accordance with inputted three dimensional computer aided design models of the assembly 20. The model may include a breakdown of the assembly 20 into a plurality of slices 118 additively built atop one-another generally in a vertical or z-coordinate direction. Each solidified slice 118 corresponds to a layer 120 of the powder bed 104 prior to solidification and each layer 120 is placed on top of a build surface 122 of the previously solidified slice 118. The controller 114 generally operates the entire system through a series of electrical and/or digital signals 124 sent to the system 100 components. For instance, the controller 114 may send a signal 124 to a mechanical piston 126 of the supply hopper 110 to push a supply powder 128 upward for receipt by the spreader 106. The spreader 106 may be a wiper, roller or other device that pushes (see arrow 130) or otherwise places the supply powder 128 over the build surface 122 of the assembly 20 (or any portion thereof) by a pre-determined thickness that may be established through downward movement (see arrow 132) of the build table 102 controlled by the controller 114. Any excess powder 128 may be pushed into the surplus hopper 112 by the spreader 106.

Once a substantially level powder layer 120 is established over the build surface 122, the controller 114 may send a signal 124 to the energy gun 108 that energizes a laser or electron beam device 134 and controls a directional mechanism 136 of the gun 108. The directional mechanism 136 may include a focusing lens that focuses a beam (see arrows 138) emitted from device 134 which, in-turn, may be deflected by an electromagnetic scanner or rotating mirror of the mechanism 136 so that the energy beam 138 selectively and controllably impinges upon selected regions of the top layer 120 of the powder bed 104. The beam 138 moves along the layer 120 melting region-by-regions of the layer 120 at a controlled rate and power, melting each region into pools that then form with, or sinter to, the adjacent build surface 122, solidify, and ultimately form the next top slice 118. The process then repeats itself where another powder layer 120 is spread over the last solidified slice 118 and the energy gun 108 melts at least a portion of that layer along with a meltback region (i.e. sintering) of the previously solidified slice 118 to form a uniform and homogeneous assembly 20, or portion thereof.

The material 61 that may be loosely packed and may further have insulating properties may be deposited as part of the powder layer 120, and may not be melted therefore requires no solidification. The powder or granular material 61, the support structure 88, the inner conduit 56 and the outer conduit 58 may all be made of the same raw powder material with the support structure and conduits being melted and solidified in a slice-by-slice fashion. The material 61 may be selectively bypassed by the energy gun 108 and thus remains in its raw form. Alternatively, the material 61 may be deposited such that once melted it has a greater porosity (i.e. less dense) than the surrounding conduits and support structure. Alternatively, the material 61 may be made of a different material than the conduits 56, 58 and possibly of a raw powder material with enhanced insulating and/or heat resistant properties such as ceramic. Such selective deposits of differing powders may be accomplished by processes typically known in the additive manufacturing arts. It is further anticipated and understood that the material 61 may function as a structural support feature for the conduits, or may be made of the same material composition as the structural support 88 or pylons, both having properties such that thermal conduction between the conduits is minimized.

Figure 7:
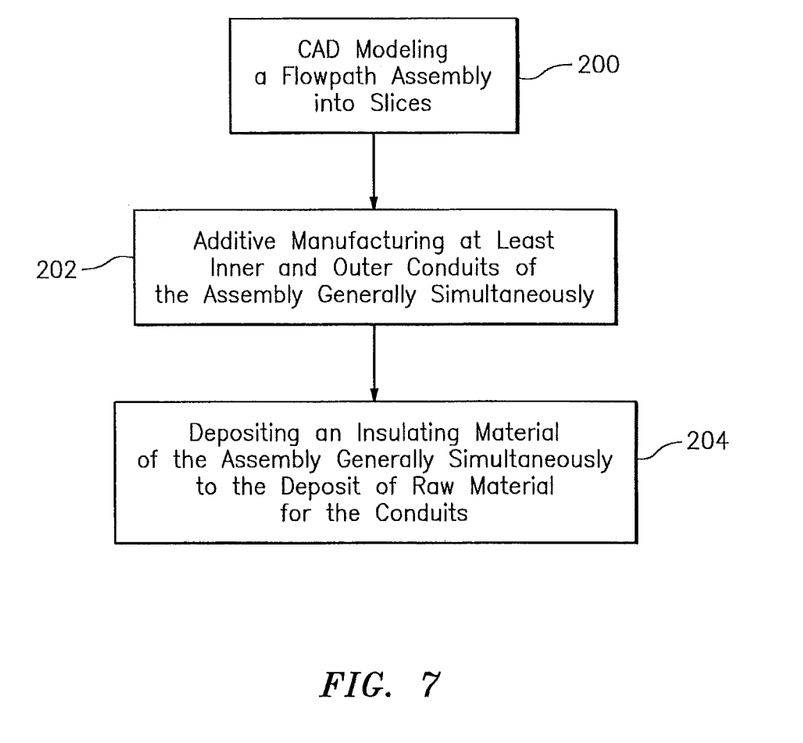
FIG. 7 is a flow chart of a method of manufacturing the flowpath assembly.

Referring to FIG. 7, a method of additive manufacturing the flowpath assembly 20 generally includes a first step 200 of CAD modeling the flowpath assembly 20 into a plurality of slices 118. The next step 202 may be additive manufacturing at least the inner and outer conduits 56, 58 and possibly the support structure 88, simultaneously. A sub-portion of step 202 may include step 204 where the insulating material 61 is deposited as part of the powder layer 120 with the exception that the region containing the insulating material 61 is not melted by the energy gun 108.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A method of manufacturing a flowpath assembly, comprising:

electronically modeling the flowpath assembly having a first conduit co-extending along a centerline and radially surrounded by a second conduit with a void defined and radially between the first conduit and the second conduit;

additive manufacturing simultaneously the first conduit, the second conduit and a support structure engaged between and connecting the first conduit and the second conduit; and depositing an insulating material in the void during the additive manufacturing of the first conduit, the second conduit and the support structure;

wherein the additive manufacturing of the first conduit, the second conduit and the support structure and the depositing the insulating material all include depositing of a powder and the flowpath assembly is electronically modeled into a plurality of slices, each slice having a portion of the first conduit, the second conduit, the support structure and the insulating material, and a first slice of the plurality of slices is manufactured in-part through melting and solidification of the powder before proceeding to the manufacture of a next successive slice of the plurality of slices, and the insulating material is not melted.

2. The method of claim 1, wherein the support structure and the insulating material are made of the same material composition.

* * * * *